United States Patent
Narita

(10) Patent No.: US 10,696,509 B2
(45) Date of Patent: Jun. 30, 2020

(54) TRANSFER TAPE

(71) Applicant: PLUS CORPORATION, Minato-ku, Tokyo (JP)

(72) Inventor: Yasuo Narita, Tokyo (JP)

(73) Assignee: Plus Corporation, Tokyo (JP)

( * ) Notice: Subject to any disclaimer, the term of this patent is extended or adjusted under 35 U.S.C. 154(b) by 5 days.

(21) Appl. No.: 16/040,187

(22) Filed: Jul. 19, 2018

(65) Prior Publication Data
US 2019/0039851 A1 Feb. 7, 2019

(30) Foreign Application Priority Data
Aug. 2, 2017 (JP) .................................. 2017-149625

(51) Int. Cl.
*B65H 37/00* (2006.01)
*C09J 7/10* (2018.01)
*B32B 38/10* (2006.01)

(52) U.S. Cl.
CPC ........... *B65H 37/007* (2013.01); *B32B 38/10* (2013.01); *C09J 7/10* (2018.01); *C09J 2201/28* (2013.01); *C09J 2201/606* (2013.01)

(58) Field of Classification Search
None
See application file for complete search history.

(56) References Cited

U.S. PATENT DOCUMENTS

| 5,456,968 A * | 10/1995 | Jones | B32B 7/12 |
| | | | 428/178 |
| 7,713,606 B2 * | 5/2010 | Kasahara | B65H 37/007 |
| | | | 428/40.1 |
| 2011/0205326 A1* | 8/2011 | Roth | B41J 2/32 |
| | | | 347/171 |

FOREIGN PATENT DOCUMENTS

JP 08-333556 A 12/1996
KR 101880116 B1 * 7/2018

OTHER PUBLICATIONS

Katsuji, Tanabe, "Transfer-Type Tacky Adhesive Sheet Material", English translation JP 08333556A, Dec. 17, 1996 (Year: 1996).*
Jung Chul Young et al., "Vehicle's Panel Having Good Anti-Delamination And Impact Resistance", machine translation of KR101880116B1, Jul. 19, 2018. (Year: 2018).*

* cited by examiner

*Primary Examiner* — Anish P Desai
(74) *Attorney, Agent, or Firm* — The Marbury Law Group, PLLC

(57) ABSTRACT

To provide a transfer tap that can increase an effective application area while preventing an occurrence of a stringing phenomenon, there is provided a transfer tape having a film-like base material and a transferable layer provided on one surface of the base material and configured to be transferred to a transfer intended surface by being pressed against from the other surface of the base material, wherein the transferable layer includes a plurality of transfer columns of a self-adhesive or an adhesive that are provided to extend in a transfer direction and wherein the transferable columns each have a plurality of block portions and a plurality of bridge portions configured to connect the block portions together and having a width dimension that is smaller than a width dimension of the block portions.

7 Claims, 5 Drawing Sheets

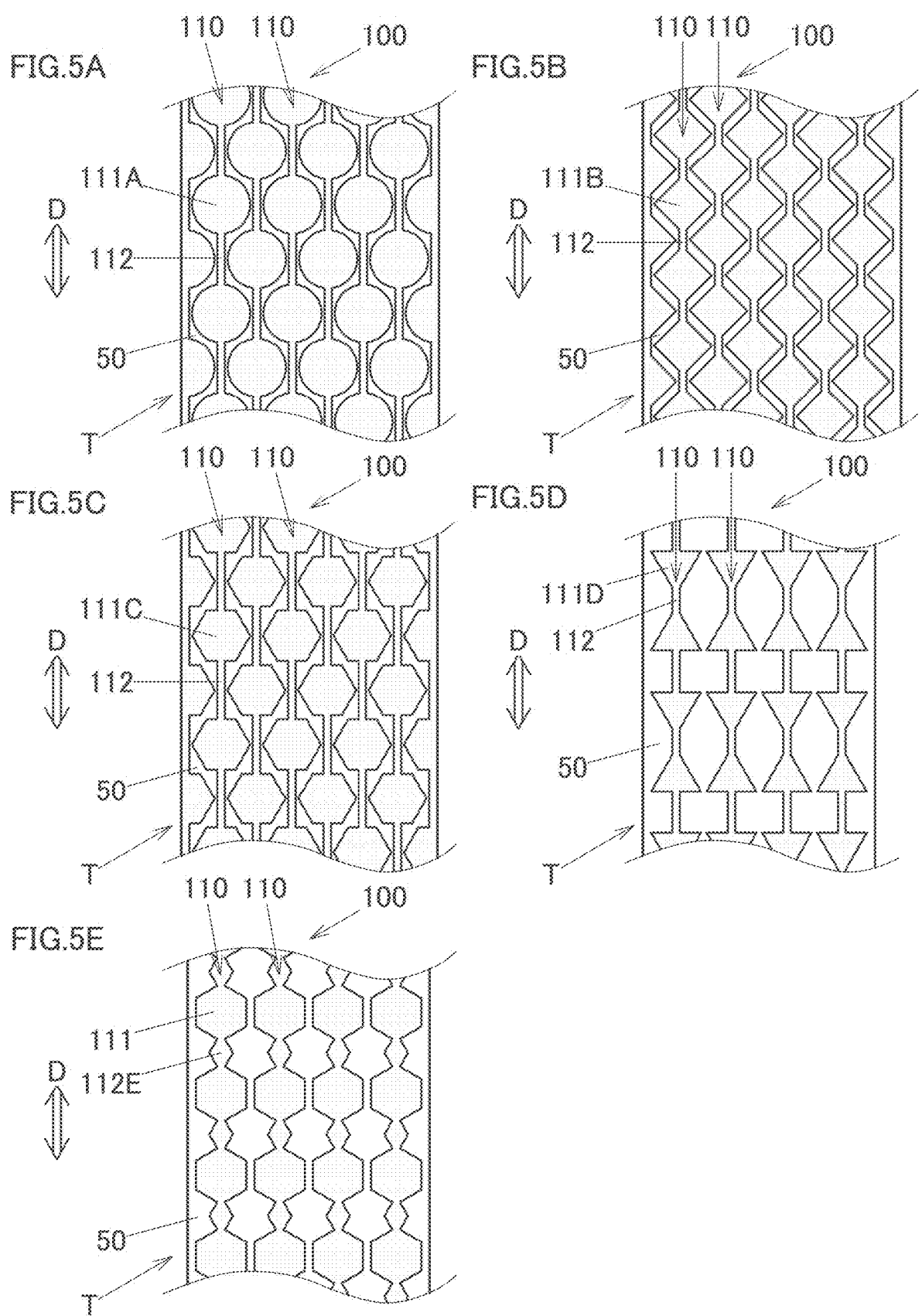

TRANSFER TAPE

CROSS-REFERENCE TO RELATED APPLICATION

This patent application is based upon and claims the benefit of priority under 35 USC 119 of Japanese Patent Application No. 2017-149625 filed Aug. 2, 2017, the entire contents of which, including the description, claims, drawings and abstract, are incorporated herein by reference.

BACKGROUND OF THE INVENTION

Field of the Invention

The present invention relates to a transfer tape configured to be transferred to a transfer intended surface by a transfer tool to affix a sheet of paper to the transfer intended surface.

Description of the Related Art

In transfer tapes that include a transferrable layer formed by a film-like base material and a self-adhesive or an adhesive that is spread on the film-like base material, a transfer tape has conventionally been disclosed in which a transferable layer is divided into blocks of self-adhesive. For example, in a transferable self-adhesive sheet material disclosed by Japanese Unexamined Patent Application No. 1996-333556 (JP-A-1996-333556), a self-adhesive layer is formed on a release carrier sheet, and the self-adhesive layer is transferred to a transfer intended surface by being pressed against. This self-adhesive layer has circular, elliptic or polygonal dots of self-adhesive.

In the case where a transferable layer that is transferred to a transfer intended surface is formed to have dots of self-adhesive, when compared with a case where a self-adhesive is spread over a whole surface of a release carrier sheet, a stringing phenomenon can be prevented from occurring. However, when a transferable layer is formed to have dots of self-adhesive, since there are formed portions where no transferable layer is formed, an area occupied by the transferable layer per unit area (an effective application area) is reduced, resulting from time to time in a reduction in a force with which a sheet of paper is affixed (affixation force). Then, when spaces defined between the dots of self-adhesive are narrowed to improve the affixation force, there are caused a problem in that the spaces are filled with a self-adhesive when forming a transferable layer.

SUMMARY OF THE INVENTION

The invention has been made in view of the situations described above, and an object of the invention is to provide a transfer tape that can increase the effective application area while preventing the occurrence of a stringing phenomenon.

According to an aspect of the invention, there is provided a transfer tape having a film-like base material and a transferable layer that is provided on one surface of the base material and is configured to be transferred to a transfer intended surface by being pressed against from the other surface of the base material, wherein the transferable layer includes a plurality of transferable columns of a self-adhesive or an adhesive that are provided to extend in a transfer direction, and wherein the transferable columns each have a plurality of block portions and a plurality of bridge portions configured to connect the block portions together and having a width dimension that is smaller than a width dimension of the block portions.

According to the aspect of the invention, it is possible to increase the effective application area while preventing the occurrence of a stringing phenomenon.

BRIEF DESCRIPTION OF THE DRAWINGS

FIG. 5A illustrates a modified example 1 of the transfer tape according to the embodiment of the invention.

FIG. 5B illustrates a modified example 2 of the transfer tape according to the embodiment of the invention.

FIG. 5C illustrates a modified example 3 of the transfer tape according to the embodiment of the invention.

FIG. 5D illustrates a modified example 4 of the transfer tape according to the embodiment of the invention.

FIG. 5E illustrates a modified example 5 of the transfer tape according to the embodiment of the invention.

DETAILED DESCRIPTION OF THE PREFERRED EMBODIMENT

Figure 1:
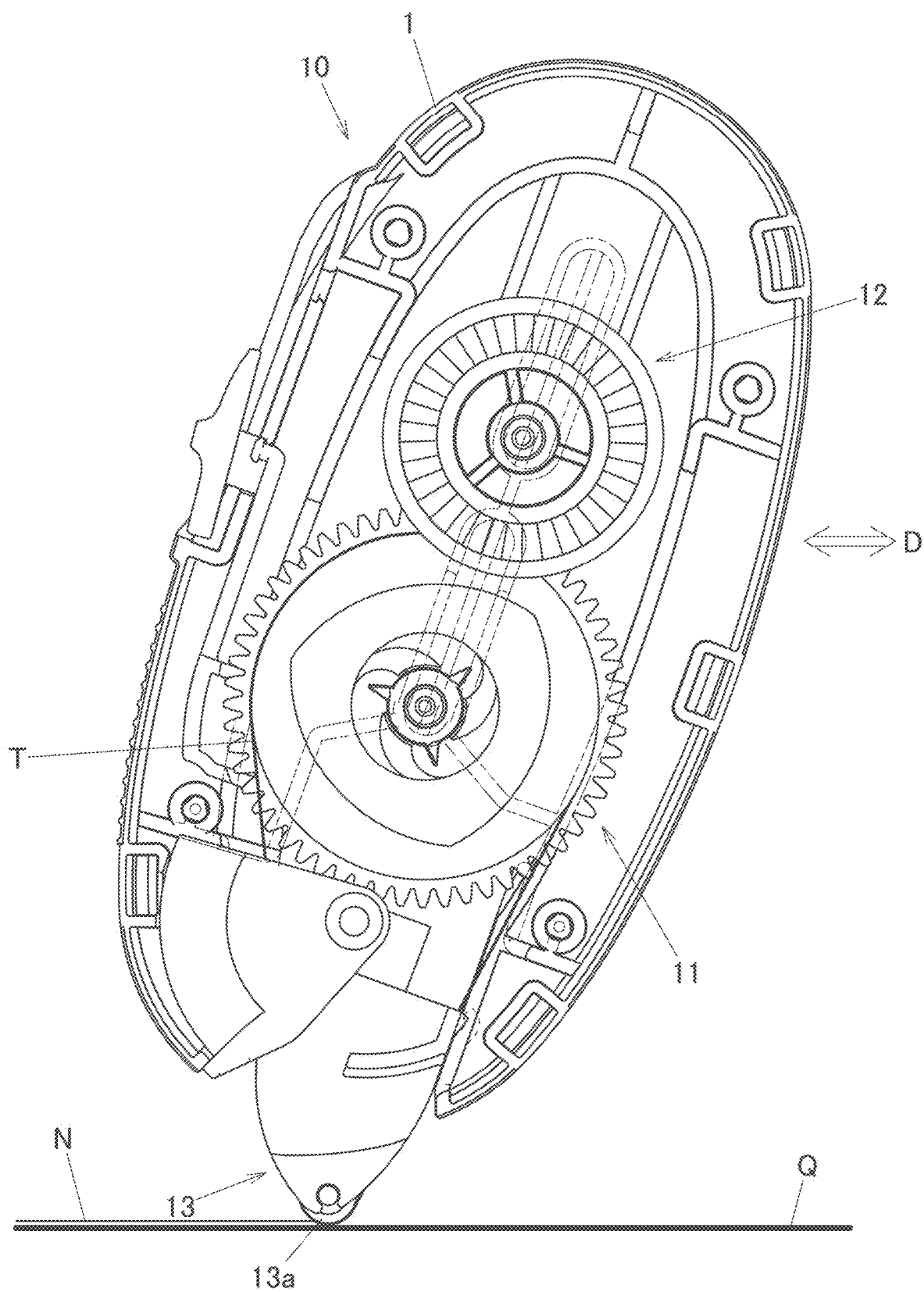
FIG. 1 is a front view illustrating an example of a film transfer tool including a transfer tape according to an embodiment of the invention.

Next, an embodiment of the invention will be described. As FIG. 1 shows, a transfer tape T according to an embodiment of the invention is used for a film transfer tool 10. The film transfer tool 10 includes in an interior of a main body case 1 a supply bobbin 11 around which an unused transfer tape T is wound and a take-up bobbin 12 around which a used portion of the transfer tape T is wound. The supply bobbin 11 and the take-up bobbin 12 are coupled together by a rotational drive mechanism. A transfer head 13 including a transfer roller 13a is provided at a front end of the film transfer tool 10. The transfer tape T that is fed out from a lower side of the supply bobbin 11 is sent to a lower side of the take-up bobbin 12 from an upper side of the supply bobbin 11 by way of the transfer roller 13a to be taken up from the lower side of the take-up bobbin 12 by moving the film transfer tool 10 from left to right in FIG. 1. It should be noted that in the following description, a direction in which the film transfer tool 10 is moved (from left to right in FIG. 1) when a transfer operation is carried out by using the film transfer tool 10 and an opposite direction to the direction in which the film transfer tool 10 is moved will be referred to as a transfer direction D. By using the film transfer tool 10 configured in the way described above, the transfer tape T is pressed against a transfer intended surface Q by the transfer roller 13a of the transfer head 13, whereby a transferable layer provided on a surface of the transfer tape T is transferred to the transfer intended surface.

Figure 2:
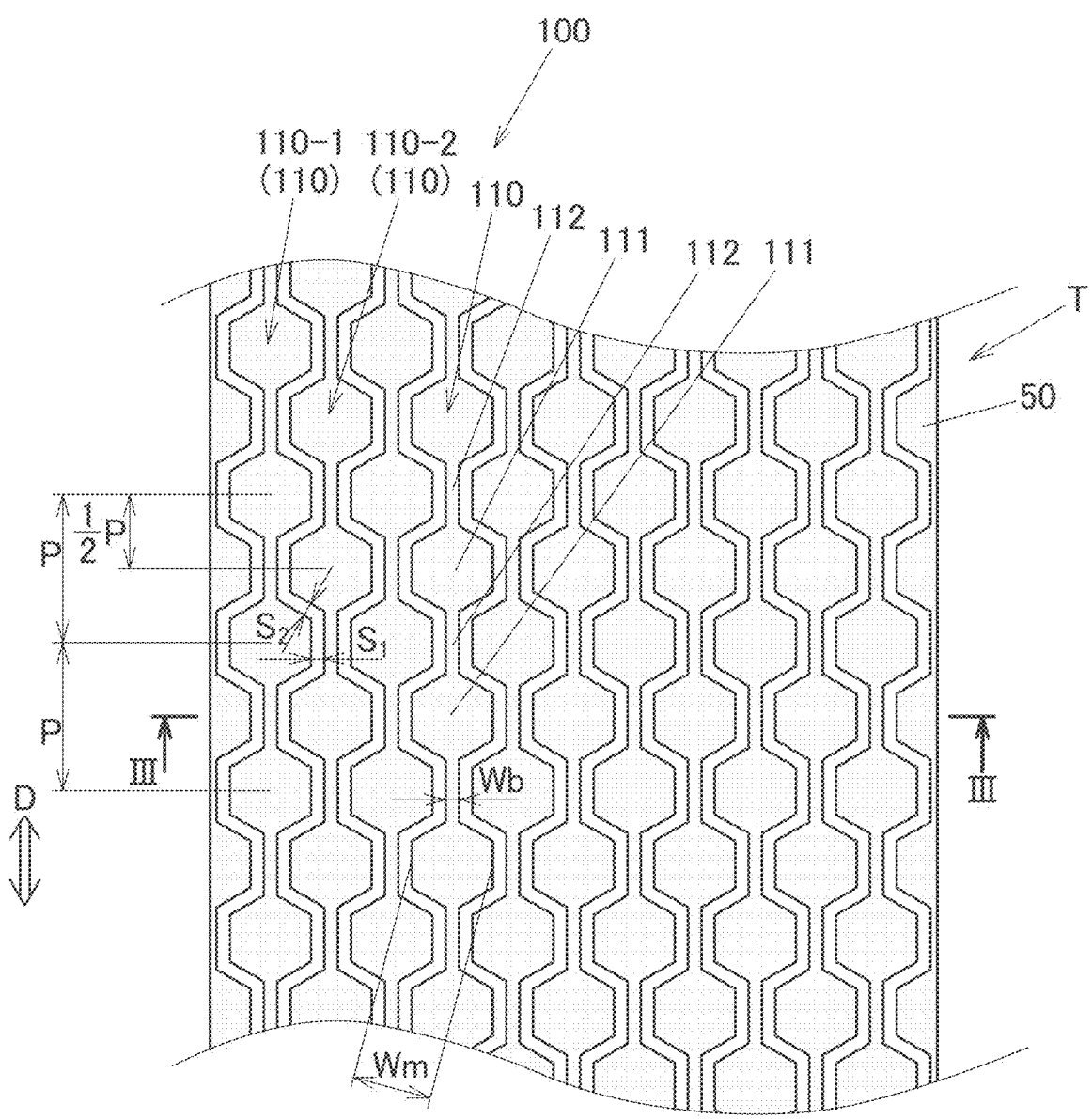
FIG. 2 is a schematic view illustrating an application pattern of a transferable layer of the transfer tape according to the embodiment of the invention.
Figure 3:
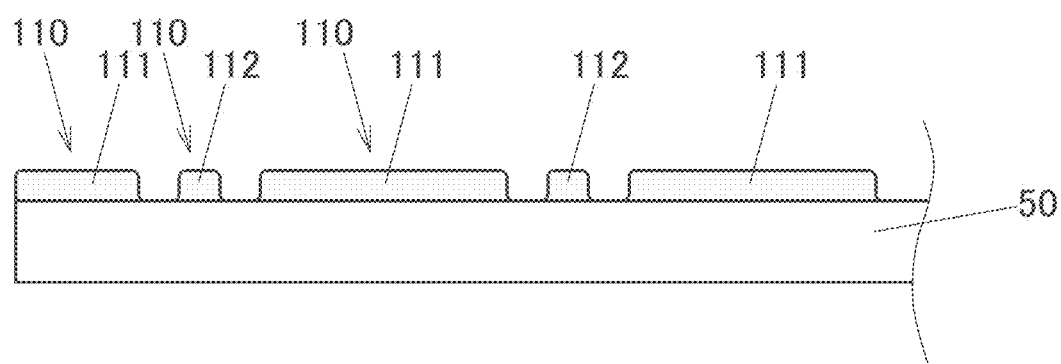
FIG. 3 is a sectional view of the transfer tape according to the embodiment of the invention illustrating a section taken along a line III-III in FIG. 2.

FIG. 2 is a front view illustrating the transfer tape T in an enlarged fashion. FIG. 3 is a sectional view taken along a line III-III in FIG. 2. The transfer tape T is formed by a film-like base material 50 and a transferable layer 100 that is provided on a surface of the base material 50 (a surface corresponding to the transfer intended surface Q at the transfer roller 13a of the transfer head 13). The base material 50 is a thin film of a transparent resin material. Depending on situations, a certain type of coating is applied to the surface of the base material 50 to facilitate a release of the transferable layer 100 when a pressure is applied to the transfer tape T. The transferable layer 100 is provided on the surface of the base material 50, which is one of surfaces of the base material 50 and is transferred to the transfer intended surface Q by being pressed from a back surface of the base material 50, which is the other surface of the base material 50.

The transferable layer 100 is formed on the base material 50 trough gravure printing. Here, the transfer direction D is also referred to as a direction in which the transferable layer 100 is transferred by a gravure cylinder or roll in a gravure printing. The transferable layer 100 includes a plurality of transfer columns 110 that are provided to extend in the transfer direction D and is then transferred to the base material 50 in a predetermined thickness. Each of the transfer columns 110 has a plurality of block portions 111 and a plurality of bridge portions 112 that connect the block portions 111 together. The block portions are each formed into a polygonal or regular hexagonal shape and is disposed so that a line that connects facing apex portions of the regular hexagonal shape becomes parallel to the transfer direction D. Then, the bridge portions 112 connect together apex portions of the block portions 111 that are formed into the regular hexagonal shape. The bridge portions 112 are each formed into a straight line.

According to the transfer tape T of this embodiment, since the block portions are formed into the regular hexagonal shape, the transferable layer 100 can be formed into a honeycomb configuration as a whole to thereby enhance the design properties of the transfer tape T and the transferable layer 100 after it has been transferred to the transfer intended surface Q. Further, since the transferable layer 100 has the bridge portions 112 that connects the block portions 111 together, in generating transfer columns 110 when fabricating a transfer tape T, a transferable layer (a self-adhesive) is allowed to flow from one block portion 111 to another block portion 111 via the bridge portion 112. Consequently, this makes it difficult to generate a lost portion in the transferable layer 100 or, in particular, the block portions. Further, in the block portions 111, the apex portions are connected together by the bridge portions 112, and therefore, the block portions are narrowed gradually towards the bridge portions 112, thereby making it possible to enhance the flowability of the transferable layer 100 further in transferring (generating) the transferable layer 100. Additionally, a risk of a stringing phenomenon (that is, a phenomenon in which the transferable layer 100 is stretched in to a string between a slight portion of the transferable layer 100 that remains on the base material 50 and a portion of the transferable layer that is transferred to the transfer intended surface Q) being generated is reduced by the block portions 111 that are disposed at predetermined intervals when the transfer tape T is operated to be transferred accordingly. Here, the bridge portions 112 are so narrow that it becomes difficult for a stringing phenomenon to be generated there.

In adjacent transfer columns 110, the block portions 111 are disposed so as to be offset from each other. Specifically, in a transfer column 110-1 and a transfer column 110-2 that lies adjacent to the transfer column 110-1, pluralities of block portions 111 are both disposed at equal intervals with a pitch P. However, the block portions 111 of the transfer column 110-1 and the block portions 111 of the transfer column 110-2 are disposed at equal intervals with a pitch that is a half of the pitch P.

In addition, the adjacent transfer columns 110 are disposed at constant intervals. Namely, in the transfer column 110-1 and the transfer column 110-2 that are disposed adjacent to each other, a space S1 between the block portion 111 of the transfer column 110-1 and the bridge portion 112 of the transfer column 110-2 and a space S2 between the block portion 111 of the transfer column 110-1 and the block portion 111 of the transfer column 110-2 are the same.

In the case where a width dimension Wb of the bridge portion 112 in a direction that intersects the transfer direction D at right angles is a width dimension that is smaller than a width dimension Wm of the block portion 111, an effective application area can be increased while preventing the occurrence of a stringing phenomenon at the block portion 111. However, it is desirable that the width dimension Wb of the bridge portion 112 is set at 50% of the width dimension Wm of the block portion 111 or smaller. This can not only enable an outline of the block portion 111 to be recognized clearly but also increase the effective application area due to the bridge portion 112. Additionally, it is desirable that the width dimension Wb of the bridge portion 112 is 0.05 mm or greater. In the case where the width dimension Wb of the bridge portion 112 is smaller than 0.05 mm, there is caused a risk of no transferable layer 100 being formed.

Next, the results of an experiment are shown as below in which how the transferable layer 100 is applied is visually verified using a microscope by varying a space ratio S (%) that is a ratio of the space between the adjacent transfer columns to the width dimension Wm of the block portion 111, a bridge width ratio W (%) that is a ratio of the width dimension Wb of the bridge portion 112 to the width dimension Wm of the block portion 111 and an effective application area ratio U (%).

Here, the space ratio S (%)=the space S1 (=S2)/the width dimension Wm of the block portion×100, the bridge width ratio W (%)=the width dimension Wb of the bridge portion/the width dimension Wm of the block portion×100, and the effective application area ratio U (%) shows a ratio of the transferable layer per unit area.

Transfer tapes T used were prepared as below. A polyethylene terephthalate (PET) film was used for a base material 50. A self-adhesive of an acryl emersion system was used as a transfer layer 100 that was applied to the base material 50. The transferable layer 100 was applied to the base material 50 using a gravure printing method at an application speed of 30 m/min. Photographs shown in FIGS. 4A to 4F are photographs that were photographed by cutting the prepared transfer tape T to a predetermined length and coloring the cut transfer tapes T using a pencil so that portions where the self-adhesive was applied became black.

<The Results of the Experiment>

TABLE 1

|  | Space Ratio S (%) | Bridge Width Ratio W (%) | Effective Application Area Ratio U (%) | Block Portion Application State |
|---|---|---|---|---|
| Comparison Example A | 7.69 | 7.69 | 84 | x |
| Comparison Example B | 15.38 | 7.69 | 72 | x |
| Example C | 11.54 | 11.54 | 78 | o |
| Comparison Example D | 15.38 | 7.69 | 73 | x |
| Example E | 11.54 | 11.54 | 74 | o |
| Comparison Example F | 23.08 | 15.38 | 64 | x |
| Example G | 7.69 | 11.54 | 85 | o |

Figure 4A:
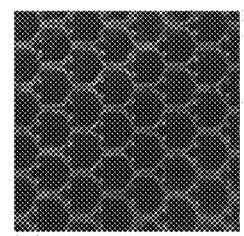
FIG. 4A shows a photograph of a comparison example A used in an experiment of transfer tapes.
Figure 4B:
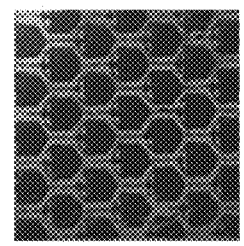
FIG. 4B shows a photograph of a comparison example B used in the experiment of the transfer tapes.
Figure 4C:
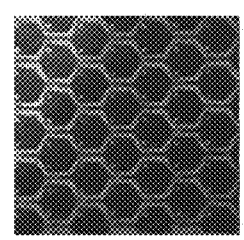
FIG. 4C shows a photograph of an example C used in the experiment of the transfer tapes.
Figure 4D:
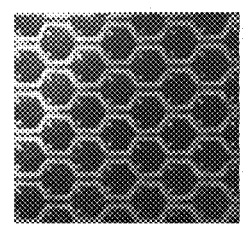
FIG. 4D shows a photograph of a comparison example D used in the experiment of the transfer tapes.
Figure 4E:
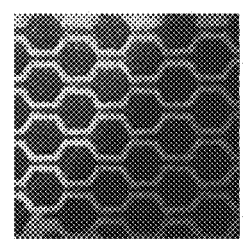
FIG. 4E shows a photograph of an example E used in the experiment of the transfer tapes.
Figure 4F:
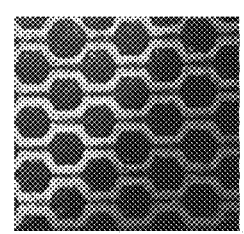
FIG. 4F shows a photograph of a comparison example F used in the experiment of the transfer tapes.

In addition, FIG. 4A shows the photograph, enlarged using the microscope, of the transfer tape T prepared as Comparison Example A, FIG. 4B shows the photograph, enlarged using the microscope, of the transfer tape T prepared as Comparison Example B, FIG. 4C shows the photograph, enlarged using the microscope, of the transfer tape T prepared as Example C, FIG. 4D shows the photograph, enlarged using the microscope, of the transfer tape T prepared as Comparison Example D, FIG. 4E shows the photograph, enlarged using the microscope, of the transfer tape T prepared as Example E, and FIG. 4F shows the photograph, enlarged using the microscope, of the transfer tape T prepared as Comparison Example F.

In FIGS. 4A to 4F, portions looking white or white portions are portions where the self-adhesive is not applied. Then, in Comparison Example A in FIG. 4A, Comparison Example B in FIG. 4B and Comparison Example D in FIG. 4D, white dot-like portions exist also in the block portions 111. These white dot-like portions indicate void portions resulting from the fact that the self-adhesive was not flowing to the portions when the transferable layer (the self-adhesive) was applied. Although white dot portions also exist in Example C shown in FIG. 4C, the white dot portions are smaller than those of Comparison Examples A, B, D, and these white dot portions are permissible. In Comparison Example E shown in FIG. 4E and Comparison Example G, which is not shown, no white dot portion exists in the block portions 111. This is because the bridge portions 112 function properly to allow the self-adhesive to flow to the block portions 11 through them as has been described before. Thus, in Example C, Example E and Example G, the transferable layer (the self-adhesive) is well applied to the block portions 111. Here, when the bridge portions have a width dimension which measures 0.05 mm or greater and which ranges from 11.50% to 50.00% of the width dimension Wm of the block portions, it is possible to obtain the transfer tape T to which the transferable layer is applied properly.

In addition, paying attention to the effective application area ratio U (%), in Comparison Examples B, D, F whose space ratio S (%) is great, the effective application area ratio takes a small value. Consequently, the outlines of the block portions can be visualized in an ensured fashion. In addition, when taking the effective application area into consideration, it is preferable that the space between the adjacent transfer columns 110 is in the range from 7.60% to 11.60% of the width dimension Wm of the block portions 111.

Thus, while the embodiment of the invention has been described heretofore, the invention is not limited by the embodiment but can be carried out in various forms. For example, the block portions 111 can take various outlines. In Modified Example 1 shown in FIG. 5A, circular block portions 111A are adopted. In Modified Example 2 shown in FIG. 5B, rhombic block portions 111B are adopted. In Modified Example 3 shown in FIG. 5C, block portions 111c are disposed so that a line connecting facing apex portions of a regular hexagonal-shaped block portion 111c becomes perpendicular to the transfer direction D. In Modified Example 4 shown in FIG. 5D, triangular block portions 111D are adopted, and the block portions 111D are disposed so that bottom sides face each other while apex portions face each other. In Modified Example 5 shown in FIG. 5E, bridge portions 112E are not in a straight line but have a different profile.

Additionally, as shown in Modified Example 4 shown in FIG. 5D and Modified Example 5 shown in FIG. 5E, the block portions 111 can also be disposed without being offset from each other. However, the effective application area can be increased by disposing the block portions 111 so as to be offset from each other.

While the transferable layer 100 is formed of the self-adhesive, the transferable layer 100 can be formed of an adhesive. Additionally, while the transferable layer 100 is formed on the base material 50 through gravure printing in this embodiment, the invention is not limited to this, and hence, the transferable layer 100 can be formed on the base material 50, for example, through screen printing. When the gravure printing is used, the transferable layer is transferred to the base material using a highly durable gravure cylinder or roll, and therefore, the gravure printing is suitable for mass production. On the other hand, when the transferable layer is transferred to the base material though screen printing, the transferable layer is formed using a mesh, and therefore, the screen printing is suitable for a multiple kinds and small lot production. Additionally, a relatively thick transferable layer can be formed through screen printing.

What is claimed is:
1. A transfer tape having:
a film base material; and
a transferable layer that is provided on one surface of the film base material and is configured to be transferred to a transfer intended surface by applying pressure to the transferable layer, through the film base material, against the transfer intended surface,
wherein the transferable layer has a plurality of transfer columns of a self-adhesive or an adhesive extending in a transfer direction,
wherein the transfer columns each have a plurality of block portions formed in a hexagonal shape and a plurality of bridge portions connecting apex portions of adjacent block portions, wherein the block portions and the bridge portions in each respective transfer column together form a continuous extent of the self-adhesive or the adhesive spaced apart from adjacent transfer columns, the bridge portions having a width dimension that is smaller than a width dimension of individual ones of the block portions, the bridge portions in each of the transfer columns being axially aligned with one another in the transfer direction,
wherein each block portion of each transfer column is aligned, in a direction extending at a right angle to the transfer direction, with a bridge portion of an adjacent transfer column; and
wherein the block portions within each respective transfer column are disposed at equal intervals.

2. The transfer tape according to claim 1,
wherein unused transfer tape is configured to be wound around a supply bobbin of a film transfer tool, and
wherein a used portion of the transfer tape is configured to be wound around a take-up bobbin of the film transfer tool.

3. The transfer tape according to claim 1,
wherein a width dimension of the bridge portions is 0.05 mm or greater and ranges from 11.5% to 50% of a width dimension of the block portions.

4. The transfer tape according to claim 2,
wherein a width dimension of the bridge portions is 0.05 mm or greater and ranges from 11.5% to 50% of a width dimension of the block portions.

5. The transfer tape according to claim 3,
wherein a space defined between the adjacent transfer columns ranges from 7.6% to 11.6% of a width dimension of the block portions.

6. The transfer tape according to claim 4,
wherein a space defined between the adjacent transfer columns ranges from 7.6% to 11.6% of a width dimension of the block portions.

7. A film transfer tool having:
a supply bobbin around which an unused transfer tape is wound, and
a take-up bobbin around which a used portion of the transfer tape is wound, the unused transfer tape having:
a film base material; and
a transferable layer that is provided on one surface of the film base material and is configured to be transferred to a transfer intended surface by applying pressure to the transferable layer, through the film base material against the transfer intended surface,
wherein the transferable layer has a plurality of transfer columns of a self-adhesive or an adhesive extending in a transfer direction,
wherein the transfer columns each have a plurality of block portions formed in a hexagon shape and a plurality of bridge portions connecting apex portions of adjacent block portions, wherein the block portions and the bridge portions in each transfer column together form a continuous extent of the self-adhesive or the adhesive spaced apart from adjacent transfer columns, the bridge portions having a width dimension that is smaller than a width dimension of individual ones of the block portions, the bridge portions in each of the transfer columns being axially aligned with one another in the transfer direction,
wherein each block portion of each transfer column is aligned, in a direction extending at a right angle to the transfer direction, with a bridge portion of an adjacent transfer column; and wherein the block portions within each respective transfer column are disposed at equal intervals.

* * * * *